United States Patent [19]
Drapala et al.

[11] Patent Number: 4,545,077
[45] Date of Patent: Oct. 1, 1985

[54] ELECTRO-OPTICAL DATA BUS

[75] Inventors: Thaddeus R. Drapala, Canyon Country; Mohammad K. Zaman, Northridge, both of Calif.

[73] Assignee: Lockheed Corporation, Burbank, Calif.

[21] Appl. No.: 437,650

[22] Filed: Oct. 29, 1982

[51] Int. Cl.$^4$ .......................... G02F 1/00; G02F 2/00; H04B 9/00; H01S 3/00
[52] U.S. Cl. .................. 455/612; 350/96.16
[58] Field of Search .............. 455/612, 606, 607; 350/96.16

[56] References Cited

U.S. PATENT DOCUMENTS

| | | | |
|---|---|---|---|
| 3,714,437 | 1/1973 | Kinsel | 250/199 |
| 4,135,202 | 1/1979 | Cutler | 455/612 |
| 4,234,968 | 11/1980 | Singh | 350/96.16 |
| 4,236,256 | 11/1980 | Brackett et al. | 455/608 |
| 4,322,737 | 3/1982 | Sliwa, Jr. | 357/59 |

FOREIGN PATENT DOCUMENTS 0149133 4/1980 Japan ................. 455/612

OTHER PUBLICATIONS

Bodley; "Fiber-Optic Communication Much Bigger, Much Faster"; Electronic Design, vol. 26, #13; Jun. 21, 1978, pp. 56-58.
Campbell; "Multiterminal Data Distribution"; Guided Wave Optical Systems and Devices; SPIE vol. 139; Mar. 1978; pp. 8-10.
Campbell; "Multiterminal Fiber Systems"; Laser Focus, Jun. 1978, pp. 42-45.
NTG-Fachber (Germany), vol. 73 (1980); "A Multiserve System Using Fiber Optic Loops"; pp. 119-124.
MIL-STD-1553b, Department of Defense, "Aircraft Internal Time Division Command/Response Multiplex Data Bus", 9/21/78, pp. 1 through 34.

Primary Examiner—Douglas W. Olms
Assistant Examiner—Frank M. Scutch, III
Attorney, Agent, or Firm—Frederic P. Smith

[57] ABSTRACT

An electrical multiplex data bus is operatively coupled to an optical multiplex data bus by means of a novel electro-optical converter arrangement to form a hybrid data transmission system in which the transition from the optical data bus to the electrical data bus or vice versa is transparent to the individual terminals and controllers connected thereto. The data on the electrical bus is encoded in a biphase Manchester II code. Within the optical portion of the system, the data is represented by three different levels of flux within the optical fiber transmission line. Since flux is a measure of the intensity of the light, it will never be less than zero; accordingly, the three flux levels may be "zero", an intermediate value "L", and a maximum value "H". A flux of zero then would correspond to a negative bi-phase electrical signal, a flux of H would correspond to a positive electrical signal and a flux of L would correspond to a transitory electrical signal that is undergoing a change of state from positive to negative (or vice versa). In one presently preferred embodiment, this is achieved by decomposing an electrical signal into two binary-valved components DATA and $\overline{DATA}$* which respectively switch two separate externally controlled current sources such that a first current source establishes the L flux level and the sum of the two current sources establishes the H level; the current sources (and thus the flux levels) are adjusted to minimal values consistent with pre-established signal-to-noise thresholds.

6 Claims, 5 Drawing Figures

ELECTRO-OPTICAL DATA BUS

FIELD OF THE INVENTION

The present invention relates generally to data buses whereby digital data may be transmitted from a transmitting terminal and received by one or more receiving terminals and more particularly to such a data bus wherein the data may be represented by a change in the light flux in a fiber optic transmission line.

BACKGROUND ART

Fiber optic data links are being given serious consideration as a replacement for electrical links for a number of reasons: wider band width, improved immunity to electromagnetic interference, electrical isolation between the interconnected equipment, and the like. In its simplest form, such a data link utilizes a junction laser or light-emitting diode (LED), for example, as the transmitting element which is modulated between zero or near zero intensity and some predetermined peak light amplitude. The modulated light signal is then processed in an optical receiver where it is converted into an electrical signal which is decoded either by a threshold detection circuit or, in the event that the duty cycle averages 50 percent, by a zero-crossing detector (which is particularly suitable for use with a Manchester data encoding scheme). However, as discussed in U.S. Pat. No. 4,236,256, entitled "Asynchronous Data Receiver," especially in the case of asynchronous systems, it is preferable to modulate the light amplitude of the laser or LED light source such that a transitionally encoded three-level optical signal results. In such a system the light amplitude has associated therewith a dc light amplitude, $L_0$, from which there may be upward transitions to a light amplitude double the normal dc amplitude or downward to a light amplitude effectively equal to zero. At the receiving end of the optical data link, it is possible to convert the light signal to an equivalent bipolar electrical signal by means of a suitable photodetector utilizing threshold detector circuits and logic circuits.

U.S. Pat. No. 3,714,437, entitled "Optical Communication System With PCM Encoding With Plural Discrete And Equally Spaced Intensity Levels," discusses the use of an N-nary PCM format where N is a positive energy greater than two and in which the intensity of each optical pulse may assume any one of N spaced apart levels. In particular, this Patent teaches the desirability of spacing the various intensity levels so as to minimize errors caused by the overlapping of intensity distribution associated with the different levels so as to maximize the information rate capability of the system. In such an optimized system, the discrete levels are not equally spaced apart but are rather determined by the formula $$I_j = \left( \frac{j-1}{N-1} \right)^2$$

where j equals 1, 2, . . . N. In the case of a tri-level code, the three such levels would be zero, ¼ and 1.

Military Standard MIL-STD-1553B dated Sept. 21, 1978 and entitled "Aircraft Internal Time Division Command/Response Multiplex Data Bus" is directed specifically to a class of electrical data buses that have been developed especially for avionics use and defines, in addition to the specific hardware characteristics of the cable and the manner in which it is coupled to the individual terminals and controllers, operational characteristics such as the use of Manchester II biphase level encoding at a transmission bit rate of one megabit per second, and also a command synch waveform. The Standard also specifies the format of the various commands to which the individual terminals and controllers are to respond. In response to specific commands issued by a designated bus controller, the individual remote terminals may exchange information with the controller or information transmitted by a first designated remote terminal may be received by a second designated remote terminal. The protocol ensures that at most only one terminal or controller will be transmitting data at any given time; when no data is being transmitted, the voltage on the line remains at zero.

Bearing the above prior art in mind, it is a primary object of the present invention to develop a fiber optic data bus analogous to the electrical bus specified by the above-referenced Military Standard 1553B such that the fiber optic data bus and the electrical data bus may be utilized simultaneously in the same system so as to permit the individual terminals to communicate with each other and with a common bus controller regardless of whether both are associated with the electrical bus or with the fiber optic bus or with one on each type of bus; that is to say, the physical differences between the electrical bus and the optical bus are "transparent" to the individual terminals/controllers and the two types of buses may be coupled to one another to form a hybrid type of data bus without any degradation in performance.

It is a more specific objective to provide such a hybrid system that has the additional advantages of improved reliability and a high degree of redundancy.

DISCLOSURE OF THE INVENTION

An electrical multiplex data bus may be operatively coupled to an optical multiplex data bus by means of a novel electro-optical converter arrangement to form a hybrid data transmission system. Preferably, both the electrical and optical buses are constructed to a common functional specification such that the transition from the optical data bus to the electrical data bus or vice versa is transparent to the individual terminals and controllers connected thereto. The data on the electrical bus is phase encoded, preferably using a biphase Manchester II code in which a single data bit is represented either as a positive pulse followed by a negative pulse or by a negative pulse followed by a positive pulse; a transition through zero occurs at the mid-point of each bit time. Within the optical portion of the system, the data is represented by three different levels of flux within the optical fiber transmission line, with a first level of flux corresponding to a negative electrical pulse, a second level of flux corresponding to an electrical zero, and a third level of flux corresponding to a positive pulse. By this means, any differences between a signal within the optical portion of the system and a signal within the electrical portion of the system will be essentially transparent.

Since flux is a measure of the intensity of the light, it will never be less than zero. Accordingly, the three flux levels may be "zero," an intermediate value "L," and a maximum value "H." In that event, it is preferable to maintain the L level as close to zero as practical, consistent with an adequate signal-to-noise ratio, and also to minimize the H level while still maintaining an adequate separation from the L level. This will minimize not only the power required to generate the light flux, but also will substantially improve the lifetime of the light emitting elements. In one presently preferred embodiment, this is achieved by providing two separate externally controllable current sources such that a first current source establishes the L flux level and the sum of the two current sources establishes the H level; a suitable adaptive algorithm may then cause the current sources (and thus the flux levels) to assume minimal values consistent with pre-established signal-to-noise thresholds.

DETAILED DESCRIPTION OF A PREFERRED EMBODIMENT

Figure 1:
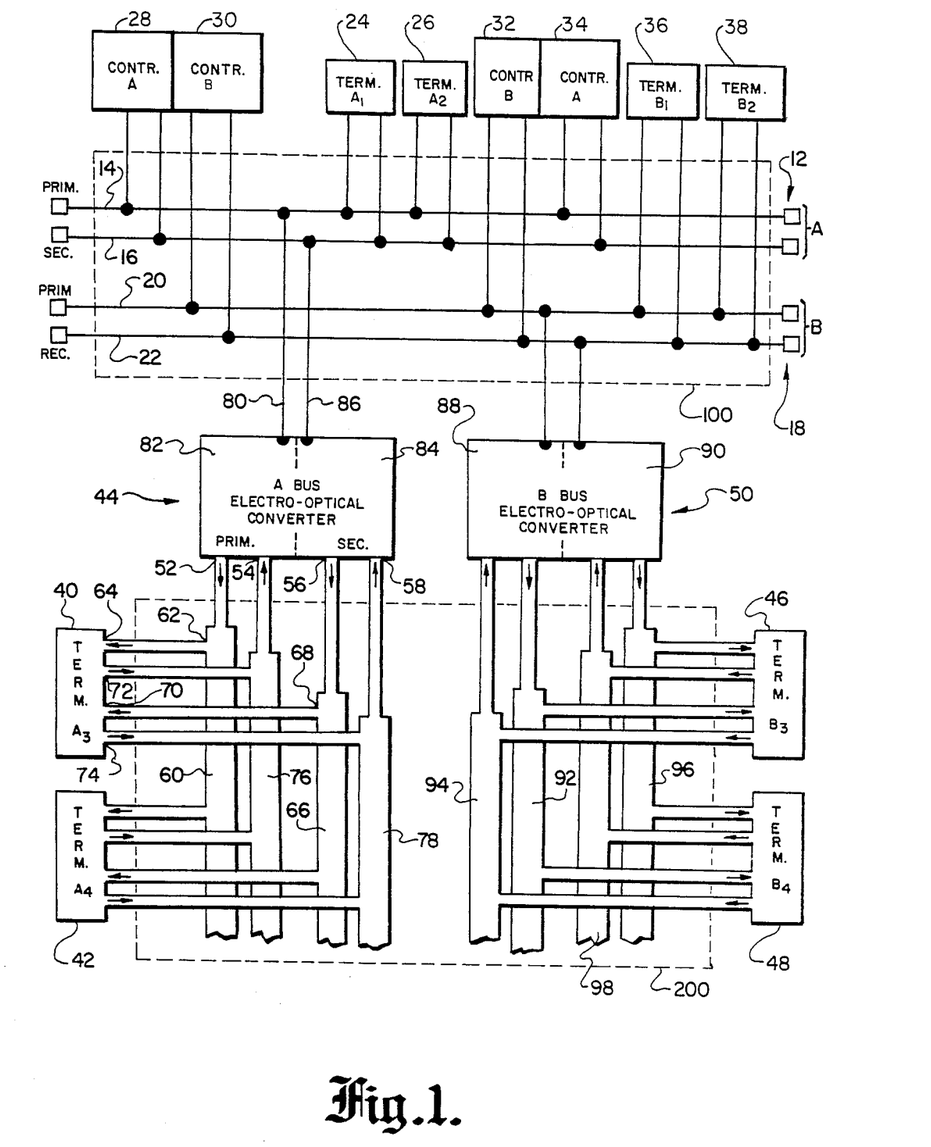
FIG. 1 is a schematic block diagram of a hybrid multiplex data bus system constructed in accordance with the present invention including an electrical bus portion, an optical bus portion and an electro-optical converter for effecting the interface between the electrical portion and the optical portion.

Reference should now be made to FIG. 1 of the drawings which is a schematic block diagram which shows a presently preferred embodiment of a hybrid multiplex data bus system constructed in accordance with the present invention. In the drawing, the electrical bus portion of the system is enclosed within a first dashed boundary (100) while the optical bus portion is enclosed within a second dashed boundary (200). Electrical portion (100) is relatively conventional and is preferably constructed in accordance with the aforementioned Military Standard 1553B. In accordance with certain options contemplated by (but not required by) said Standard, electrical data bus (100) is quadruply redundant and in fact incorporates four separate two-way data links. The first two collectively form the A bus (12) which in turn comprises a primary A bus (14) and a secondary A bus (16). In similar manner, there is also provided a B bus (18) comprising a primary B bus data link (20) and a secondary B bus data link (22). Associated with the $A_1$ bus (12) is a pair of terminals, namely, the A terminal (24) and the $A_2$ terminal (26). Also connected to the A bus (12) is the A bus controller (28).

As shown in the drawing, the A bus controller (28) is also associated with a backup B bus controller (30) which is connected to the B bus (18). Thus, the A bus controller (28) and the backup B bus controller (30) can communicate with one another directly without resorting to the use of the A bus (12), in the event that a serious malfunction condition is detected on the A bus (12) and/or with its associated A bus controller (28). The functions that normally would have been allocated to the A bus (12) may then be performed by the B bus (18) under the direction of the backup B bus controller (30). Alternatively, if the fault is such that only the A bus controller (28) is affected, then the backup B bus controller (30) may function as a terminal connected to the B bus (18) so as to transmit an appropriate message to the B bus controller (32) via the B bus (18) which it will be noted is directly connected to the backup A bus controller (34), so that the backup A bus controller (34) may take over the critical functions of the inoperative A bus controller (28). It will also be seen that two additional terminals, namely the $B_1$ terminal (36) and the $B_2$ terminal (38), are also directly connected to the B bus (18). In addition to the above-described system-level redundancy, it will be understood that each of the two buses, namely, the A bus (12) and the B bus (18), is itself provided with a double level of redundancy whereby data is normally transmitted on the primary bus (14 or 20), but in the event of a malfunction, the secondary bus (16, 20) may be utilized to transmit a command to disable the malfunctioning terminal and/or to activate a backup controller.

Still referring to FIG. 1, it will also be seen that in addition to the various electrical terminals and electrical controllers associated with the electrical bus subsystem (100), there are also provided a plurality of optical terminals associated with the optical data bus subsystem (200). In particular, there are provided $A_3$ and $A_4$ optical terminals (40, 42) that optically transmit and receive data from a first electro-optical converter (44) that is also connected electrically to the primary and secondary buses (14, 16) of the A bus (12), and there are also provided $B_3$ and $B_4$ optical terminals (46, 48) communicating via a second electro-optical converter (50) with the electrical B bus, with separate electrical connections being made to the primary B bus (20) and to the secondary B bus (22).

For the sake of the following description, it may be assumed that all four depicted optical terminals (40,42,46,48) may be identical to one another and that the system may also comprise additional optical terminals not shown. Furthermore, the two illustrated electro-optical converters (44, 50) may also be identical to one another and additional such electro-optical converters may be utilized to effect a functional connection between the illustrated optical data bus subsystem (200) and other electrical data bus subsystems similar to that shown in the Figure. In addition, there may also be provided optical controller/backup controller pairs similar to the electrical controller/backup controller pairs (28, 30) but communicating directly with the corresponding optical buses within the optical data bus subsystem (200).

Referring now specifically to the first optical terminal $A_3$ (reference number 40) and the first electro-optical converter (44), it will be seen that the electro-optical converter (44) includes a primary transmit port (52), a primary receive port (54), a secondary transmit port (56) and a secondary receive port (58). Connected to the primary transmit port (52) is a primary transmitting coupler (60) which includes a first output port (62) connected to a corresponding primary input port (64)

associated with the $A_3$ terminal (40). In a similar fashion a secondary transmitting coupler (66) is connected to the secondary transmit port (56) of the converter (44); this second transmitting coupler (66) has a first output port (68) connected to a corresponding secondary input (70) on the $A_3$ terminal (40).

In addition to being able to receive information transmitted from the first converter (44) via the two transmitting couplers (60, 66), the $A_3$ terminal (40) is also provided with the capability of transmitting data by means of a primary output port (72) and a secondary output port (74) coupled respectively to a primary receiving coupler (76) and a secondary receiving coupler (78) which respectively combine the data transmitted from the various associated optical terminals (40, 42) and transmit the thus combined signal respectively to the primary receive port (54) and to the secondary receive port (58) of the converter (44).

Since the illustrated optical bus arrangement (200) is comprised of unidirectional elements such as the transmitting coupler (60) and the receiving coupler (76), it will be appreciated that in order for a first designated terminal (such as the $A_3$ terminal (40)) to transmit data to a second designated terminal (such as the $A_4$ terminal (42)), it is necessary for the information to be relayed from the receiving coupler (76) to the transmitting coupler (60) via the electro-optical converter unit (44). Simultaneously, the converter unit (44) also transmits an equivalent electrical signal via its primary electrical connection (80) to the primary bus (14) of the electrical A bus subsystem (12) for reception by the various electrical terminals and controllers (24, 26, 28, 34) connected thereto. Thus, data originating from a particular A bus optical terminal is broadcast to all the terminals associated with the A bus, whether the other such terminals are optically coupled to an optical bus or are electrically coupled to an electrical bus.

In a similar fashion, electrical data transmitted by one of the electrical terminals (e.g., $A_1$ terminal (24)), is received via the converter's primary electrical connection (80), converted into optical form, and transmitted from the corresponding primary transmit port (52) for reception by the various optical terminals (40, 42) associated with the various receiving and transmitting couplers (60,66,76,78) which together comprise a redundant two-way optical data bus.

Thus, it will be appreciated that by providing a suitable electro-optical converter unit (44), it is possible to couple an electrical data bus (100) to an optical data bus (200) such that the overall functioning of the system is not affected by whether a particular terminal is an optical terminal connected to an optical data bus or an electrical terminal connected to an electrical data bus. In other words, it should be "transparent" to the receiving terminal whether the data originated with an optical terminal or an electrical terminal and furthermore, whether the data path from the originating terminal to the receiving terminal included purely optical elements or purely electrical elements or a combination of both.

Still referring to FIG. 1, it will be seen that the electro-optical converter (44) may in fact comprise two essentially identical modules: a first module (82) associated with the primary data bus (14) and the primary transmitting and receiving couplers (60, 76), and a second module (84) coupled to the secondary electrical data bus (16) via a secondary electrical connection (86) and associated with the secondary transmitting and receiving couplers (66, 78).

In a similar fashion, in the quadruply redundant system shown in the Figure, the second converter (50) also comprises similar first and second modules (88, 90), respectively, with its first module (88) being associated with the primary electrical bus (20) of the electrical B bus subsystem (18) as well as with optical transmitting and receiving couplers (92, 94) that together comprise the primary optical B bus, while the second module (90) of the second converter (50) is connected to the secondary optical B bus comprising respective optical B bus transmitting and receiving couplers (96, 98).

From the above it will be seen that each of the electro-optical converters (44, 50) must have the capability of receiving an electrical data signal at its respective electric connection (80, 86) and generating in response thereto a corresponding optical signal to be transmitted via the relevant transmitting coupler (60, 66, 92 or 96); furthermore, the converter must also be able to receive an optical signal from the relevant optical receiving coupler (76, 78, 94 or 98) and then apply a corresponding signal to the respective electrical bus (14, 16, 20 or 22) and transmit corresponding optical data via the relevant optical transmitting coupler (60, 66, 92 or 96). Although in theory numerous means exist for converting an electrical signal into an optical signal or vice versa, in practice not all such means are equally compatible with the system objectives of maintaining a high signal-to-noise ratio, low propagation delay and a high rate of data transmission, preferably utilizing circuit components that are relatively inexpensive and easy to obtain through normal commercial sources.

Accordingly, the presently preferred embodiment of the electro-optical converters (44, 50) is based upon an integrated bi-phase/TTL interface circuit commercially available from Circuit Technology, Inc. under Part No. CT 3231. Although this circuit is adequately described in the user documentation published by its manufacturer under the title "Low Power Driver/Receiver CT 3231 (October 1979)," a brief explanation of its functioning with respect to the particular types of waveforms that will typically be encountered in the hybrid electro-optical multiplex data bus of FIG. 1 will be described in some detail with respect to FIGS. 2 and 3, with FIG. 2 being concerned with the function of a so-called "transmitter" section of the circuit which accepts two TTL signals as an input and produces a corresponding bi-phase differential output across the aircraft's two output lines and FIG. 3 being particularly concerned with a so-called "receiver" section of the CT 3231 circuit which accepts the bi-phase differential signal across a pair of input links.

Figure 2:
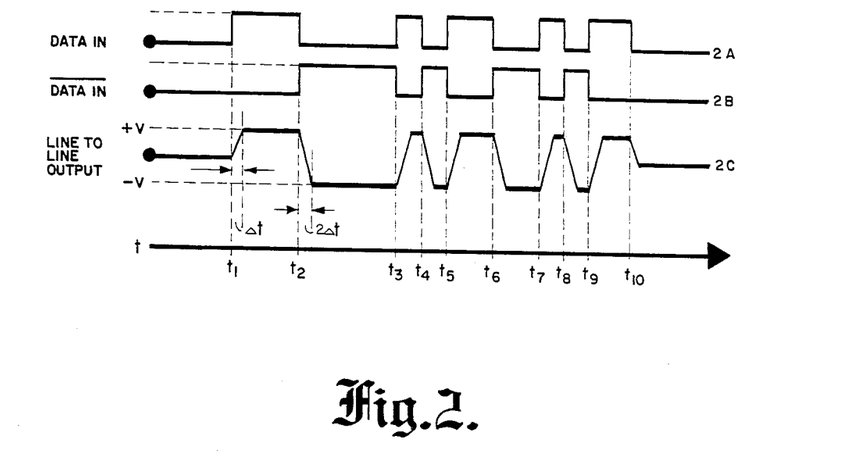
FIG. 2, comprising waveforms 2A, 2B and 2C, is a series of waveforms oriented along a common time base that depict how the driver logic included within the electro-optical converter produces a biphase line output from a pair of complementary logic signals.

Referring now to FIG. 2, it will be seen that this Figure shows three separate waveforms, labeled respectively 2A, 2B and 2C, oriented along a common time base, T. In particular, the upper two waveforms, 2A and 2B, represent complementary logic signals, DATA IN and $\overline{\text{DATA IN}}$. It will be seen that both DATA IN and $\overline{\text{DATA IN}}$ are at their low ("0") state until time $t_1$, indicative of no data being input. From time $t_1$ through time $t_{10}$, the DATA IN and $\overline{\text{DATA IN}}$ signals are complementary to one another, indicating that actual data is being input. At time $t_{10}$ both signals again assume their low value indicative of an absence of data.

Referring now specifically to the bi-phase line-to-line output waveform 2C, it will be seen that the output voltage is 0 volts prior to time $t_1$ and subsequent to time $t_{10}$, that is to say when no data signal is present the bi-phase output waveform remains at 0. However, while data is present (throughout the interval $t_1$ through $t_{10}$), the bi-phase line-to-line output will be either at $+V$ (corresponding to data input of logical 1), or $-V$ (corresponding to data input of logical 0), or will be in the process of transitioning from $+V$ to $-V$ or vice versa. In particular, it will be seen that the bi-phase output waveform 2C remains at 0 until time $t_1$, whereupon it rises over a finite transition interval $\Delta t$ to a value $+V$ and remains at $+V$ until the input data switches from a logical 1 to a logical 0 (at time $t_2$), whereupon the bi-phase output waveform 2C drops to a value $-V$ (at time $[t_2 + 2\ \Delta t]$, 2 $\Delta t$ being the time required for the transition from $+V$ to $-V$). At time $t_3$, the TTL data signal (2A, 2B) switches from logical 0 to logical 1 and the bi-phase output signal (2C) commences to rise to the value $+V$ where it remains until time $t_4$, when the TTL signal reverts to a logical 0 state and the bi-phase output starts to drop to $-V$. At time $t_5$ the situation is reversed and the bi-phase output goes back to $+V$ until time $t_6$, when it again drops to $-V$. Further similar transitions occur at times $t_7$, $t_8$, and $t_9$ until finally at time $t_{10}$ no further data is present at the input to the transmitter section of the CT 3231 circuit (waveforms 2A and 2B are both at their logical 0 state) and accordingly the bi-phase line-to-line output signal 2C returns to 0 volts at time $t_{10}$ plus $\Delta t$.

It will be appreciated that the above discussion and related waveforms diagrams do not necessarily relate to any particular data encoding scheme but rather show in a general way how specific data values (or the absence of any data) may be represented as complementary transistorized logic circuit signals having essentially zero rise time (waveforms 2A and 2B) or, alternatively, as voltage fluctuations between a pair of wires comprising a transmission cable having a finite transition delay as the signal is caused to swing from its high value to its low value or vice versa.

Figure 3:
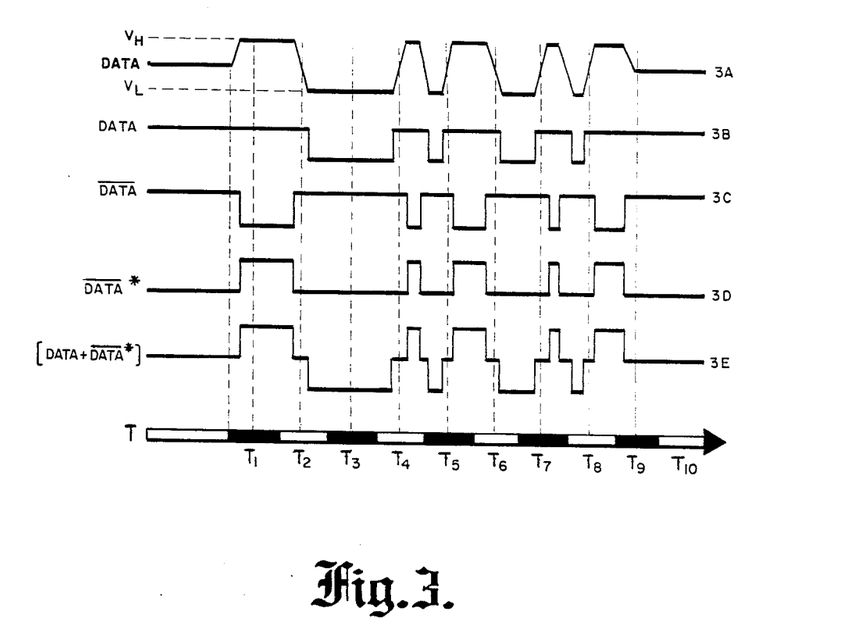
FIG. 3, comprising waveforms 3A, 3B, 3C, 3D and 3E, is another set of waveform diagrams oriented along a similar common time base showing how the optical transmitter portion of the electro-optical converter generates the required changes in the flux level of the fiber optic transmission line in response to changes in the level of the biphase encoded data.

Referring generally to FIG. 3 and in particular to the bi-phase line-to-line waveform (3A) shown at the top of the Figure, it will be seen that this waveform is substantially identical to that shown by waveform 2C and described above in connection with the transmitter section of the converter circuit. In particular, it may be interpreted as a bi-phase burst of data being transmitted along an electrical multiplexed data line in accordance with the standard set out in the above-referenced Military Standard 1553B.

In order to better understand the Figure, the time line T has been divided into equal intervals, $T_1$, $T_2$, $T_3$, $T_4$, etc., each such time period corresponding to a single bit time.

Still referring to the input bi-phase waveform 3A, it will be seen that commencing at bit time $T_1$ and continuing through the third bit time $T_3$, the waveform is a "synch" waveform which is an invalid Manchester waveform, being of one polarity during the entirety of the first 1½ bit times and then of the opposite polarity for the following 1½ bit times. At the midpoint of bit time $T_4$, the waveform 3A is rising and thus represents a logical 0 in accordance with conventional Manchester code. Similarly, the waveform is rising during the midpoint of bit time $T_5$ and thus a second binary 0 is represented. In similar fashion, the third data bit is a logical 1 (since the waveform is falling in bit time $T_6$), the fourth bit is a 0 (a rising waveform in the middle of bit time $T_7$) and the fifth bit is also a 0 (a rising waveform in the middle of $T_8$). In the interests of simplicity, the waveform (3A) in the Figure is shown as returning to 0, commencing at the middle of bit time $T_9$, and thus the burst of data comprises only five data bits in addition to the synch code. However, it will be understood that in accordance with MIL-STD-1553B, data words typically include 16 data bits and 1 parity bit subsequent to the synch code. (Command and status words employ a similar format, but with the polarity of the synch code reversed.)

In order to reproduce optically the electrical waveform 3A into a corresponding "transparent" variation in the level of the light flux within a fiber optic cable in accordance with the requirements of the present invention, the input waveform (3A) is first encoded as two TTL binary-valued signals, labeled respectively DATA (waveform 3B) and $\overline{\text{DATA}}$ (waveform 3C). The DATA signal represents the positive excursions of the input waveform; that is, the logical waveform (3B) is positive whenever the input waveform (3A) is above a lower threshold $V_L$. By comparing waveform (3B) with waveform (3A) and the time scale T, it will be seen that the corresponding DATA signal is high until the input waveform has dropped below $V_L$ (just after the middle of the second bit time $T_2$), and it then remains low until just prior to the midpoint of the fourth bit time $T_4$. It then remains high until just after the start of the fifth bit time $T_5$ and goes low for relatively short intervals during the first halves of the $T_5$ and $T_8$ bit times and for a somewhat longer interval between the mid points of bit times $T_6$ and $T_7$. From a comparison with the waveform 3A, it will be seen that these time periods when the DATA signal is low correspond to the intervals during which the waveform (3A) is at or below its negative threshold voltage $V_L$; the balance of the time, the original input waveform (3A) is above that threshold and the corresponding logical DATA signal is high. In particular, it should be noted that a Manchester-encoded bi-phase waveform has a theoretical 50% duty cycle (since the transition from $V_L$ to $V_H$, representing a logical 0, or from $V_H$ to $V_L$, representing a logical 1, is specified to occur at the middle of a bit time); however, the corresponding DATA signal has a duty rate of somewhat greater than 50%, since, as noted previously, a finite time is required for the bi-phase signal, as represented by waveform (3A), to swing down to its lower threshold value of $V_L$.

Referring now specifically to the $\overline{\text{DATA}}$ waveform of 3C, it may be seen that this waveform is similar to the DATA waveform of 3B, but represents negative excursions—that is to say, the $\overline{\text{DATA}}$ waveform (3C) is high whenever the corresponding bi-phase waveform (3A) is below the upper threshold $V_H$. Accordingly, for the same reason that the DATA waveform will have a duty factor somewhat less than 50%, the duty factor of the $\overline{\text{DATA}}$ waveform will be over 50% by a like amount (ignoring the situation prior to time $T_1$ and subsequent to the midpoint of time period $T_9$, when the input bi-phase waveform (3A) is at a neutral value intermediate the upper and lower thresholds, since no data or synch pulses are then being transmitted).

Waveform 3D, identified in the Figure by the symbol $\overline{\text{DATA}}^*$, is the logical inverse of the $\overline{\text{DATA}}$ waveform of 3C. Thus, whenever the $\overline{\text{DATA}}$ waveform (3C) is high, the $\overline{\text{DATA}}^*$ waveform (3D) is low and vice versa. By so inverting the $\overline{\text{DATA}}$ waveform, the result is a signal that is high when the corresponding portion of the bi-phase waveform (3A) is at or above the upper threshold $V_H$. Since the DATA waveform 3B is low whenever the corresponding portion of the bi-phase waveform (3A) is at or below the lower threshold V<sub>L</sub>, it may be seen that by combining the DATA waveform (3B) with the $\overline{\text{DATA}}$* wave form (3D) by means of a simple current summation network, a three-valued waveform (3E) results that closely approximates the original bi-phase waveform (3A). As will become more clear hereinafter, the CT 3231 circuit produces the corresponding DATA and $\overline{\text{DATA}}$ outputs that are described above. The formation of the $\overline{\text{DATA}}$* output waveform (3D) and the [DATA+$\overline{\text{DATA}}$*] three-valued signal (3E) are then performed externally to the CT 3231 circuit in a manner that will become more apparent upon review of the specific circuit of FIG. 4.

Figure 4:
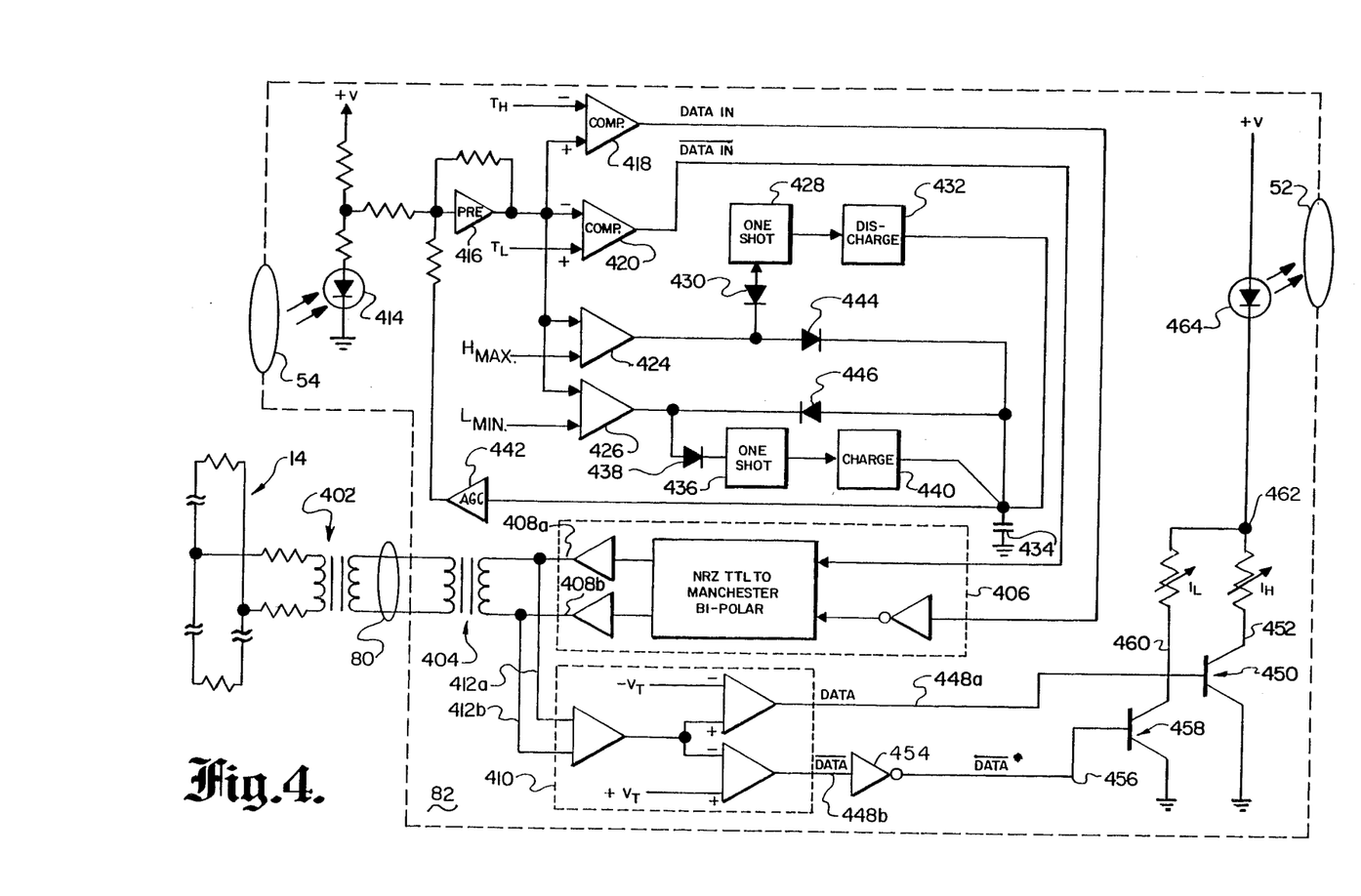
FIG. 4 is a schematic block diagram of a single transmit/receive channel within the electro-optical converter shown in FIG. 1.

Reference should now be made to FIG. 4, which it will be recalled is a schematic block diagram of a single transmit/receive channel. In particular, FIG. 4 may represent the first module (82) of the A bus electro-optical converter (44) shown in FIG. 1. In any event, the individual transmit/receive converter channel shown in FIG. 4 is electrically connected to an electrical data bus such as primary A electrical data bus (14) of FIG. 1 and optically connected to the optical data transmission subsystem (200) by means of an optical input (receiving) port (54) and an optical output (transmitting) port (52). As provided in the aforementioned MIL-STD-1553B, the converter unit (82) is preferably connected to the electrical data bus (14) by means of a stub connection (80) and isolated by means of a pair of coupling transformers (402, 404). A driver circuit (406) has its bi-phase line output (408a, 408b) connected to stub line (80) by means of the second coupling transformer (404); a receiver circuit (410) has its respective bi-phase receive input (412a, 412b) coupled in parallel with the driver output (408a, 408b). As a result of such an arrangement, any electrical signal originating from the electrical data bus (14) will also be present as an input to the receiver circuit (410); furthermore, the output of the driver circuit (406) will be present not only on the electrical data bus (14) but also at the input (412a, 412b) to the receiver circuit (410).

The light flux present at the input port (54) is directed onto a light sensitive photo diode (414) and the resulting signal is then amplified by means of a preamplifier circuit (416), whereupon it is compared (by means of a pair of comparator circuits (418) and (420)) with respective lower and upper thresholds T<sub>H</sub> and T<sub>L</sub>. In the event that the amplified output from the pre-amplifier (416) exceeds the upper threshold value T<sub>H</sub>, then the output of the first comparator (418) will go high and the transistor logic level signal DATA IN will be a logical one. On the other hand, if the voltage representing the amplified light flux incident on photo diode (414) is below a lower threshold value T<sub>L</sub>, then the output from the second comparator circuit (420), $\overline{\text{DATA IN}}$, will be a logical one. Furthermore, in the event that the amplified voltage representing the light flux is at an intermediate value between upper threshold T<sub>H</sub> and lower threshold T<sub>L</sub>, both outputs from the respective comparators (418) and (420) will be logical zeroes, which will indicate the absence of meaningful data at that particular point in the time.

In order to provide automatic gain control (AGC), the output from the amplifier circuit (416) is also applied to a pair of differential amplifiers (424) and (426). In the event that the output from the pre-amplifier (416) exceeds a pre-established maximum, H<sub>max</sub>, then the output of the first differential amplifier (424) will be high and a positive trigger will be applied to a first one-shot multivibrator circuit (428) via a first diode (430), whereupon the multivibrator circuit (428) activates a discharged circuit (432) which causes an automatic gain control capacitor (434) to be discharged by a predetermined decrement. On the other hand, if the output of the preamplifier (416) is below a pre-established minimum, L<sub>min</sub>, then the output of the second differential amplifier (426) will go negative, whereupon a (negative) trigger signal is received by the second one-shot multivibrator circuit (436) via a second diode (438) which in turn will result in the activation of a charging circuit (440) which will charge the automatic gain control capacitor (434) by a predetermined increment. The voltage across the AGC capacitor (434) is amplified by an AGC amplifier (442), the output of which serves to bias the input of the preamplifier (416).

Thus, the above-described AGC circuit serves to confine the output of the preamplifier (416) within the range established by maximum and minimum values H<sub>max</sub> and L<sub>min</sub>, respectively. The circuit also tends to maintain the average value of the output of the preamplifier (416) at a predetermined point within that range by alternative charge and discharge paths respectively through a third diode (444) and a fourth diode (446). In the event that the average output from the preamplifier (416) is at the desired intermediate value, then the output of the first differential amplifier (424) will consist of positive pulses and that of the second differential amplifier (426) will consist of negative pulses and the charging current through the third diode (444) will effectively cancel out the discharging current through the fourth diode (446). However, as the average output value increases toward H<sub>max</sub>, the positive pulses from the differential amplifier (424) will be reduced in magnitude while the negative pulses from the second differential amplifier (426) will increase in magnitude; thus the discharging current through the fourth diode (446) will exceed the charging current through the third diode (444) and the charge on the AGC capacitor (434) (and the associated biasing of the input to the preamplifier (416)) will be reduced over a period of time. Conversely, as the output of the preamplifier (416) drops toward L<sub>min</sub>, then the magnitude of the negative pulses from the second differential amplifier (426) will be reduced while the magnitude of the positive pulses from the first differential amplifier will increase, with the net effect on the capacitor (434) being to increase its charge.

As noted previously, the converter/receiver circuit (410) may be the receiver section of a CT 3231 interface circuit, in which case the DATA and $\overline{\text{DATA}}$ outputs (448a, 448b, respectively) will correspond to the waveforms (3B, 3C) of FIG. 3, in response to the illustrated input waveform (3A) being input across the bi-phase line voltage inputs (412a, 412b).

Again referring specifically to FIG. 4, it will be seen that the TTL signal on the DATA output line (448a) is input to a first current switching circuit (450), the output of which (452) will be either zero current or a predetermined first current $I_H$.

In a similar fashion, the $\overline{\text{DATA}}$ output (448b) is conditioned by a single inverter stage (454) to form the complementary signal $\overline{\text{DATA}}$* (456) prior to being input to a second current switching circuit (458), for producing an output (460) which may either be a second current level $I_L$ or 0. The two currents output at terminals (452) and (460) of the two current switching circuits (450, 458, respectively) are summed by means of a junction (462) and drive a light-emitting diode (464). By reference to FIG. 3, it will be seen that whenever $\overline{\text{DATA}}$* is high, then DATA is then high also, and thus the three possible current levels from the junction (462) and the LED (464) are 0, $I_L$, and $[I_L+I_H]$.

Figure 5:
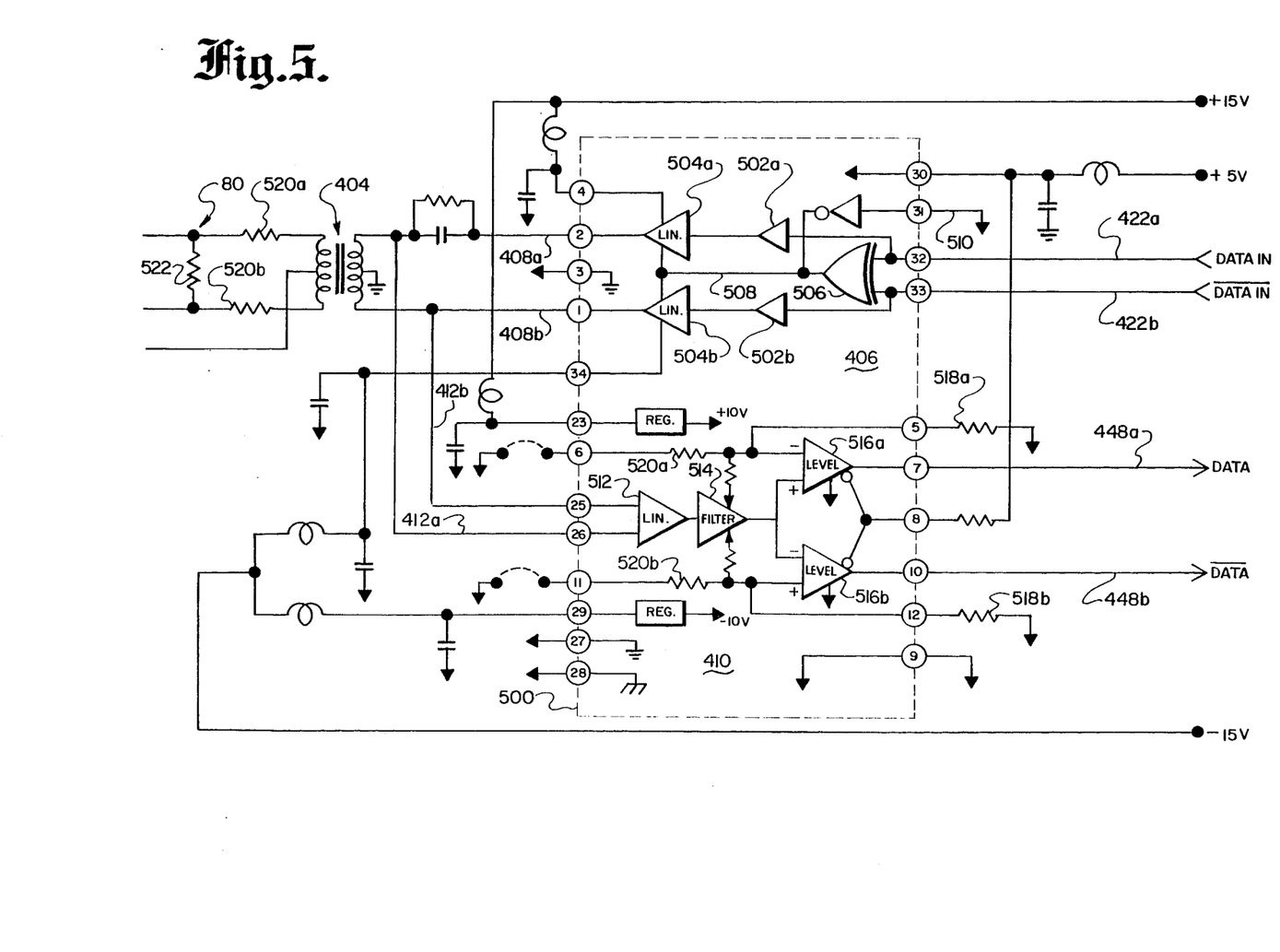
FIG. 5 is a more detailed circuit schematic diagram of the electrical transceiver portion of the single channel converter unit of FIG. 4.

Referring now to FIG. 5, which it will be recalled is a more detailed circuit schematic diagram of the electrical transceiver portion of the schematic block diagram of FIG. 4, it will be seen that the driver circuit portion (406) and the receiver circuit portion (410) are contained within a single integrated circuit (500) such as the aforementioned CT 3231 bi-phase/TTL interface circuit, with the bi-phase signals being shown on the left-hand side of the Figure and the TTL signals on the right-hand side. Thus, as explained previously, complementary TTL signals DATA IN and $\overline{\text{DATA IN}}$ (422a and 422b, respectively) are input [via Pins 32 and 33] to the transmitter portion (406) of the interface circuit (500) where they are inverted by a respective pair of inverters (502a, 502b) and then amplified by a pair of linear amplifiers (504a, 504b) so as to produce a 30-volt peak-to-peak differential signal across a nominal 140 ohm load. In the illustrated embodiment, the isolation transformer (404) has a gain of unity, and the two fault isolation resistors (520a, 520b) each have a nominal value of 52.5 ohms. The load resistor (522) provides a termination impedance of 70 ohms to which should be added the load resulting from the other receivers connected to the data bus. The two signals (422a, 422b) are also fed to an exclusive-OR gate (506), the output of which (508) is provided to both of the linear amplifiers (504a, 504b) so as to cause their respective outputs (408a, 408b) to assume relative ground potential and the output of the driver circuit portion (406) at its output terminals (408a, 408b) to assume a relatively high impedance which effectively removes the driver from the remainder of the data bus line (14, 80), in the event meaningful data is not present on the input lines (422a, 422b) and accordingly the two input signals are not complements of each other. There is also provided a transmission inhibit input (510) which in the case of the present embodiment is permanently grounded, since it is desired that there be transmission of data from the optical input port (54) to the electrical data bus (14) whenever meaningful data is present on the driver circuit's input lines (422a, 422b). Alternatively, the inhibit input (510) could be used in conjunction suitable fault detection circuitry (not shown) which would apply a logical 1 on pin (31), thereby forcing the respective outputs of both of the linear amplifiers (404a, 404b) to go low and thereby effectively causing the driver circuit (406) to be removed from the data bus.

As noted above with reference to FIG. 4, concurrently with the transmission of the optically derived data onto the electrical bus (14) via the transmitter portion (406), the same electrical data is also input to the receiver portion (410) via the receiver inputs (412a, 412b) where it is conditioned by a linear amplifier (512) and a filter (514) and then fed to a pair of level detector circuits (516a, 516b) associated respectively with thresholds established by a pair of respective external threshold fixed resistances (518a, 518b). Alternatively, by grounding pins 6 and 11 of the integrated circuit assembly, internal thresholds established by resistors (520a, 520b) may be used, in which case data signals on the receiver input lines (412a, 412b) exceeding one volt peak-to-peak will be detected and the signals having a peak-to-peak voltage of less than 0.5 volts will be ignored.

Mention has been previously made of an an adaptive algorithm to minimize the flux levels within the optical buses 200 so as to reduce the flux levels to minimal values determined by preestablished signal to noise criteria. It will be appreciated that in an optical multiplex data bus systems such as represented by the lower half of FIG. 1, if one of the terminals fails with one of it outputs (e.g., the primary output port (72) of the $A_3$ optical terminal (40)) stuck in an on position, then there will always be a considerable background flux present in the primary receiving converter (76) and, accordingly, if another terminal is to communicate with the first electro-optical converter module (82) via the converter (76) then such terminal must be capable of generating sufficient changes in the overall flux intensity that its data output can be distinguished from the background. Furthermore, the magnitude of the constant background flux caused by such a failed terminal will be determined by whether one or both of the current switches (450,458) are turned on and whether their output current (452, 460) has been set to minimum or to maximum or to some intermediate value. Furthermore, the transmission lines themselves will be subject to additional transmission and coupling losses as additional terminals are connected therewith and to further attenuation as the cable length is increased (either a physical increase resulting from the replacement of the cable with a longer cable extending to additional terminals or an effective increase in cable length caused by a requirement to propagate a signal to or from a distant, normally inoperative terminal.

Another aspect to be taken into consideration in setting the various flux levels is the effect on the lifetime of the light emitting diode. It will be appreciated that a significant increase in the mean time between failure (MTBF) can be achieved by a corresponding reduction in the maximum average current flowing through the diode, which in turn will correspond to a similar reduction in the light flux output by the diode.

Accordingly, it will normally be advantageous to adjust the flux level to the minimum level that will result in an acceptable rate of error (for example, 1 in $10^9$ which is the standard presented by MIL-STD-1553B), since by so reducing the flux level there will be a correspondent decrease in current level through the light emitting diode or other light generating element and a corresponding resultant increase in the lifetime of the light emitting element. In the case of currents $I_L$ and $I_H$ respectively associated with the outputs (460, 452) of current switching devices (458, 450) of the type that are adjusted manually, then it will normally be preferable during both the initial installation of the data transmission system and any subsequent maintenance to adjust the current supplied to the light emitting diode (464) within the electro-optical converter (82) to a point below which the various optical terminals connected thereto no longer decode the incoming data in an acceptably error-free manner.

In the same manner, the light emitting diodes associated with the transmitting portions of each of the individual terminals may also be adjusted to minimal values consistent with acceptable performance.

Even greater advantages of enhanced reliability can be obtained in the event that the converter's current levels (460, 452) and the corresponding levels in each of the remote optical terminals can be incremented in response to digital commands from the bus controller, since a simple software algorithm may then make appropriate adjustments in the current levels associated with the operation of each of the light eitting diodes in each of the optical transmitting circuits whenever it may be desirable to do so. As an example of such an algorithm, the controller associated with the bus would first adjust the flux level associated with the output of the converter module (82) by transmitting data to one or more of the remote optical terminals via the converter's transmitting circuit and then monitoring the bus for the status word from the remote terminals signifying that error-free data has been received. In that case, the controller would then command a reduction in the flux level output by the converter module's transmission circuitry and again check for error-free reception, repeating this process until the flux level has been reduced to a sufficiently low value to result in an erratic response from the remote terminal indicative of an error rate in excess of that permissable, whereupon the controller would command a slight increase in the flux level to restore a minimum acceptable level of performance. The time associated with such a procedure would preferably be reduced by commanding successive changes in flux level related to one another by multiples of two, a so-called "successive binary approximation" technique.

Assuming that the individual terminals are also provided with the capability of adjusting the light flux associated with their optical output in response to digital commands from the bus controller, the controller then should command each individual terminal to vary its own output flux level while transmitting data to the controller until the desired minimal satisfactory level has been determined.

In order to insure that the system will continue to operate at an acceptable error-free level, the flux levels should be adjusted at frequent intervals; alternatively, the controller could continuously monitor the error rate associated with the various transmissions on its associated optical bus and as soon as the rate exceeds the permissible amount, could then cause the setting algorithm to again be performed and appropriate new flux levels established, thus in effect providing a fault tolerant mode of operation.

While the invention has been described in detail with respect to certain specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:
1. An electro-optical multiplex bus comprising:
   an electrical bus;
   a fiber optic bus comprising a receiving fiber optic cable and a transmitting fiber optic cable;
   a converter module for effecting a transparent connection between said electrical bus and said fiber optic bus, said converter module comprising,
     an optical input port,
     an optical receiver circuit operatively coupled to said optical input port and responsive to changes in light flux thereat for applying a corresponding electrical bi-phase signal to said electrical bus,
     an optical output port, and
     an optical transmitter circuit operatively coupled to said output port and responsive to electrical bi-phase signals carried on said electrical bus for generating corresponding changes in light flux at said output port;
   a plurality of optical terminals, each of said optical terminals having a terminal input port and a terminal output port;
   means for optically coupling said transmitting cable to the respective output ports of said optical terminals and to said input port of said converter module;
   means for optically coupling said receiving cable to said converter module output port and to the respective input ports of said optical terminals; and
   a data bus controller for transmitting command signals to a particular one of said optical terminals via said converter module transmitter circuit and for receiving status word signals generated by said particular terminal in response to said command word signals, said status signals being transmitted to said controller via said optical receiver circuit of said converter module.
2. The multiplex bus of claim 1 further comprising:
   an electrical bus controller operatively coupled to said electric bus.
3. The multiplex bus of claim 1 further comprising:
   a plurality of electrical terminals each operatively coupled to said electrical bus.
4. The multiplex bus of claim 2 wherein said optical transmitter circuit comprises means for adjusting the flux level associated with the output of said transmitter circuit in response to a flux adjust command from said controller.
5. The multiplex bus of claim 4 wherein said controller is programmed to transmit said flux adjust command in accordance with a flux adjustment algorithm.
6. The multiplex bus of claim 5 wherein said algorithm utilizes a successive approximation technique.

* * * * *